US012562133B2

(12) United States Patent
Tang

(10) Patent No.: US 12,562,133 B2
(45) Date of Patent: Feb. 24, 2026

(54) DISPLAY DEVICE AND DRIVING METHOD THEREOF

(71) Applicant: WUHAN CHINA STAR OPTOELECTRONICS TECHNOLOGY CO., LTD., Hubei (CN)

(72) Inventor: Wei Tang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 78 days.

(21) Appl. No.: 18/705,464

(22) PCT Filed: Apr. 1, 2024

(86) PCT No.: PCT/CN2024/085299
§ 371 (c)(1),
(2) Date: Apr. 26, 2024

(87) PCT Pub. No.: WO2025/194526
PCT Pub. Date: Sep. 25, 2025

(65) Prior Publication Data
US 2025/0299640 A1 Sep. 25, 2025

(30) Foreign Application Priority Data
Mar. 22, 2024 (CN) .......................... 202410342163.1

(51) Int. Cl.
*G09G 3/34* (2006.01)
*G02F 1/1333* (2006.01)
(Continued)

(52) U.S. Cl.
CPC ....... *G09G 3/342* (2013.01); *G02F 1/133308* (2013.01); *G02F 1/133602* (2013.01);
(Continued)

(58) Field of Classification Search
CPC ............................... G09G 3/001; G09G 3/002
See application file for complete search history.

(56) References Cited

U.S. PATENT DOCUMENTS

| | | | | |
|---|---|---|---|---|
| 5,669,690 A * | 9/1997 | Hodson | ................ | H04N 13/337 |
| | | | | 348/E13.058 |
| 7,710,516 B1 * | 5/2010 | Jeffway, Jr. | .......... | G09G 3/3426 |
| | | | | 345/102 |
| 2009/0256795 A1 * | 10/2009 | Naum | .................. | G09G 3/3426 |
| | | | | 349/68 |

FOREIGN PATENT DOCUMENTS

| | | |
|---|---|---|
| CN | 1981538 A | 6/2007 |
| CN | 110174812 A | 8/2019 |

(Continued)

OTHER PUBLICATIONS

International Search Report in International application No. PCT/CN2024/085299, mailed on Jun. 4, 2024.

(Continued)

*Primary Examiner* — Roy P Rabindranath
(74) *Attorney, Agent, or Firm* — PV IP PC; Peter Stecher; Wei Te Chung

(57) ABSTRACT

The present application provides a display device and a driving method thereof. The display device includes a first monochrome screen driven by a first sub-display signal and cooperating with first sub-light to display a first sub-image in the first subframe and driven by a second sub-display signal and cooperating with second sub-light to display a second sub-image in a second subframe, a second monochrome screen driven by a second display signal and cooperating with second light to display a second image in the frame (including first and second subframes), a first light source projecting first light (including first and second sub-light), and a second light source projecting second light.

(Continued)

100

A first image (including first and second sub-images) and a second image cooperatively present a target image.

19 Claims, 14 Drawing Sheets

(51) Int. Cl.
*G02F 1/13357* (2006.01)
*G02F 1/1343* (2006.01)
*G09G 3/00* (2006.01)

(52) U.S. Cl.
CPC .. *G02F 1/133621* (2013.01); *G02F 1/134309* (2013.01); *G09G 3/002* (2013.01); *G09G 3/3413* (2013.01); *G09G 2310/08* (2013.01); *G09G 2340/10* (2013.01)

(56) References Cited

FOREIGN PATENT DOCUMENTS

| CN | 210323739 U | 4/2020 |
| CN | 112327504 A | 2/2021 |
| CN | 113986169 A | 1/2022 |
| CN | 114660879 A | 6/2022 |
| CN | 219958062 U | 11/2023 |
| JP | H03262294 A | 11/1991 |

OTHER PUBLICATIONS

Written Opinion of the International Search Authority in International application No. PCT/CN2024/085299, mailed on Jun. 4, 2024.

* cited by examiner

201/202

First sub-display signal

First sub-display message set

R1  R2  R3  R4  R5  R6        R1918 R1919 R1920

First message set

Third message set

R2073600

R2073659

R2073658

M

First message set

Third message set

Second sub-display signal

Second sub-display message set

G1  G2  G3  G4  G5  G6        G1918 G1919 G1920

Second message set

Fourth message set

G2073600

G2073659

G2073658

M

Second message set

Fourth message set controlling the first monochrome screen to present the first sub-deflection angle in the first subframe according to the first sub-display signal, and controlling the first light source in the first subframe to project the first sub-light extending through the first monochrome screen to display a first sub-image on the display carrier — S1 controlling the first monochrome screen to present the second sub-deflection angle according to the second sub-display signal in a second subframe, and controlling the first light source to project the second sub-light extending through the first monochrome screen in the second subframe to display a second sub-image on the display carrier, wherein the first image comprises the first sub-image and the second sub-image — S2 controlling the second monochrome screen to present a second deflection angle according to a second display signal in the frame, and controlling the second light source to project a third sub-light extending through the second monochrome screen in the frame to display a second image on the display carrier, wherein a color of the first light is different from a color of the second light, the first image and the second image make the display carrier to present a target image, and a frame of the first monochrome screen and a frame of the second monochrome screen are synchronous — S3

FIG. 18

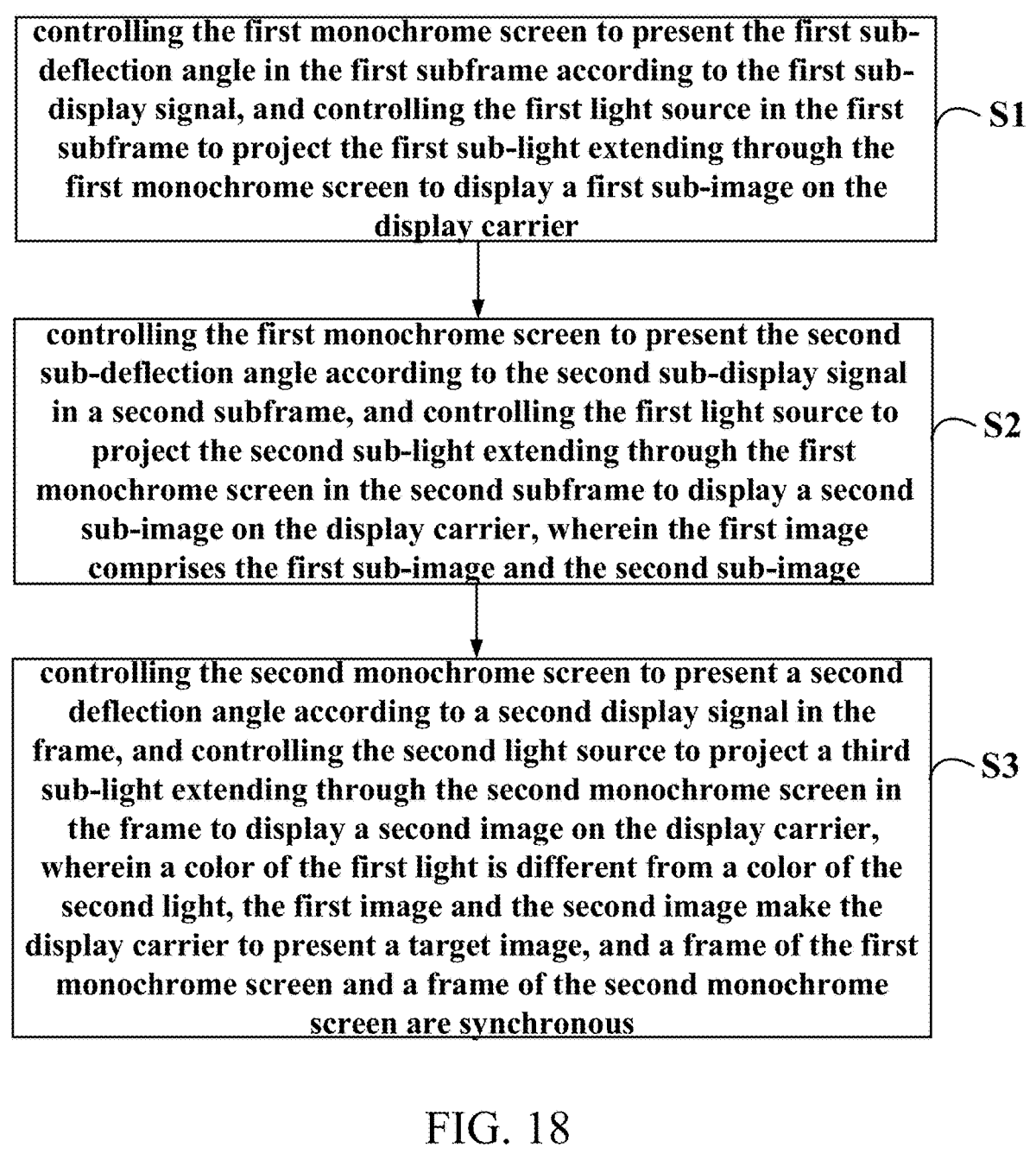

DISPLAY DEVICE AND DRIVING METHOD THEREOF

CROSS REFERENCE TO RELATED APPLICATIONS

This application claims the priority of International Application No. PCT/CN2024/085299, filed on Apr. 1, 2024, which claims the priority to Chinese Patent Application No. 202410342163.1, filed on Mar. 22, 2024. The entire disclosures of the above applications are incorporated herein by reference.

FIELD OF INVENTION

The present application relates to a field of display technologies, especially to a display device and a driving method thereof.

BACKGROUND OF INVENTION

The basic principle of a liquid crystal display (LCD) projector is to utilize a liquid crystal module to modulate the color light projected from a light source onto the screen. Depending on the number of liquid crystal display panels used (including at least the corresponding liquid crystal module), it can be divided into two types: single-panel and three-panel. In the single-panel type, the principle is that a white light source projects through the liquid crystal display panel and eventually projects the displayed content onto a carrier (for example a screen). In the three-panel type, the principle is to use three types of colored light sources to project through the corresponding three panels of the liquid crystal display without color films. The displayed content is then projected onto a carrier (for example, a screen) through refracted light paths.

The drawback of single-panel LCD projectors is that the brightness of the displayed image is lower under the same light source conditions, while the drawback of three-panel LCD projectors is that the larger number of liquid crystal display panels results in a larger apparatus volume.

Therefore, conventional single-panel and three-panel LCD projectors each have the aforementioned issues and urgently require improvement.

SUMMARY OF INVENTION

The embodiment of the present application provides a display device and a driving method thereof to mitigate a technical issue of a projector of a conventional single-panel LCD displaying image with lower brightness under the same light source and a project of a conventional three-panel LCD having a greater quantity of liquid crystal display panels and resulting a greater apparatus volume.

The embodiment of the present application provides a display device, comprising:

a display carrier;

a first monochrome screen configured to receive a first display signal;

a second monochrome screen configured to receive a second display signal;

a first light source configured to project a first light extending through the first monochrome screen and cooperate with the first display signal to display a first image on the display carrier; and a second light source configured to project second light extending through the second monochrome screen and cooperate with the second display signal to display a second image on the display carrier, wherein the first image and the second image are combined to present a target image on the display carrier;

wherein the first display signal comprises a first sub-display signal and a second sub-display signal, and the first sub-light and second sub-light comprise different colors;

wherein the second light comprises a third sub-light, a color of the third sub-light is different from any one of a color of the first sub-light and the color of the second sub-light;

wherein a frame comprises a first subframe and a second subframe, the first monochrome screen is configured to receive the first sub-display signal in the first subframe and receive the second sub-display signal in the second subframe;

wherein the first light source is configured to project the first sub-light extending through the first monochrome screen in the first subframe and cooperate with the first sub-display signal to display a first sub-image on the display carrier, and is configured to project the second sub-light extending through the first monochrome screen in the second subframe and cooperate with the second sub-display signal to display a second sub-image on the display carrier, and the first image comprises the first sub-image and the second sub-image.

Advantages

The present application provides a display device and a driving method thereof. A first monochrome screen configured to present first deflection angle according to a first display signal, a second monochrome screen configured to present a second deflection angle according to a second display signal are disposed. A frame comprising a first subframe and a second subframe. the first monochrome screen presents the first sub-deflection angle in the first subframe according to the first sub-display signal, and cooperates with a first sub-light source to project a first sub-light extending through the first monochrome screen in the first subframe to display a first sub-image on the display carrier. The first monochrome screen presents the second sub-deflection angle in the second subframe according to the second sub-display signal, and cooperates with a second sub-light source to project a second sub-light extending through the first monochrome screen in the second subframe to display a second sub-image on the display carrier. Also, a second light source is configured to project a third sub-light (a color thereof is different from that of the first sub-light and second sub-light) extending through the second monochrome screen to display a second image on the display carrier. The first sub-image, the second sub-image, and the second image commonly constitute a target image of a frame to achieve both compact volume and high brightness of the display device.

DESCRIPTION OF DRAWINGS

The following further explains the present invention through the attached drawings. It should be noted that the drawings in the following description are only used to elucidate some embodiments of the present invention. For those skilled in the art, additional drawings can be obtained without exerting inventive effort based on these drawings.

FIG. 18 is a flowchart of the display device provided by the embodiment of the present application driving method.

DETAILED DESCRIPTION OF PREFERRED EMBODIMENTS

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

The embodiment of the present application provides a display device that can comprise but is not limited to the following embodiments and combinations of the following embodiments.

Figure 1:
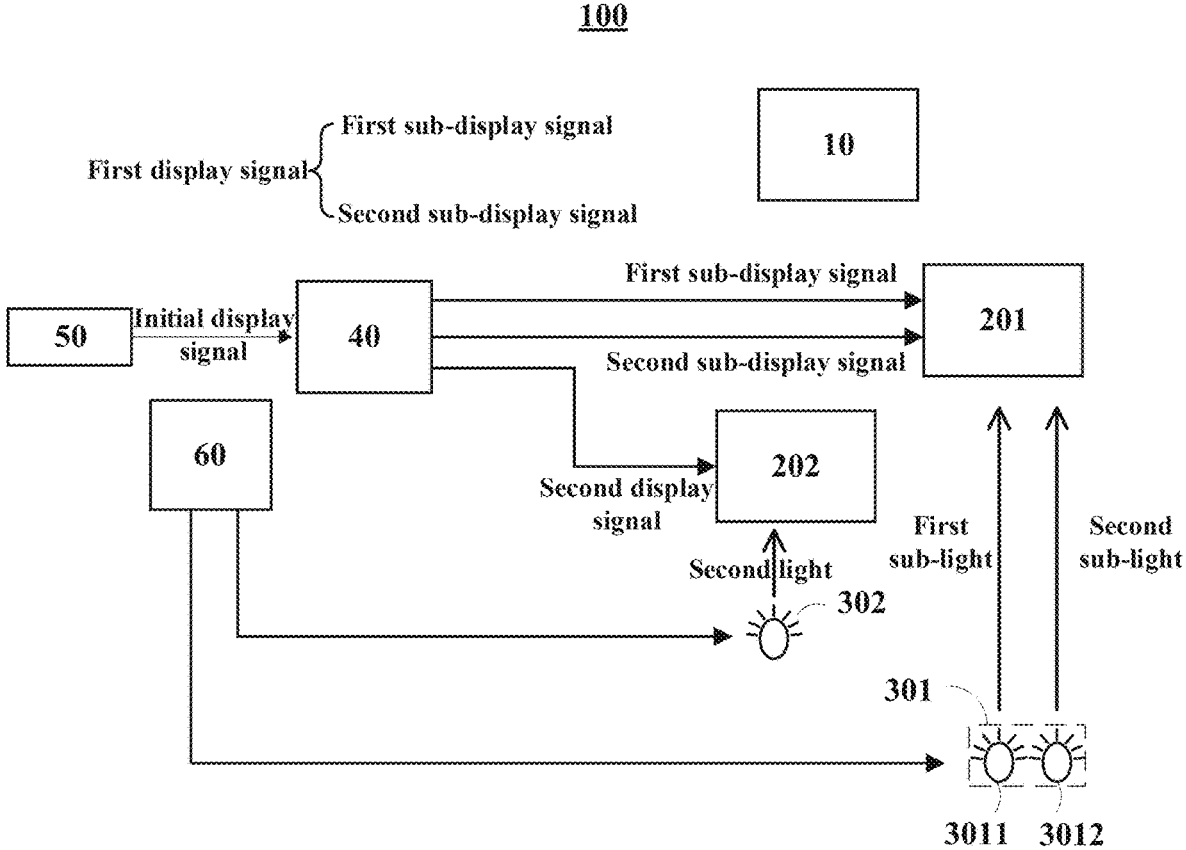
FIG. 1 is a structural framework diagram of a display device provided by an embodiment of the present application.

In some embodiments, as shown in FIG. 1, a display device 100 comprises: a display carrier 10; a first monochrome screen 201 configured to present a first deflection angle according to a first display signal; a second monochrome screen 202, configured to present a second deflection angle according to a second display signal; a first light source 301 configured to project a first light extending through the first monochrome screen 201 to display a first image on the display carrier 10; and a second light source 302 configured to project a second light extending through the second monochrome screen 202 to display a second image on the display carrier 10, wherein the first image and the second image are combined to present a target image on the display carrier.

In particular, the display carrier 10 can be but is not limited to a carrier, such as a curtain, capable of receiving and reflecting light to present an image. Because the first light source 301 and the second light source 302 can provide the first monochrome screen 201 and the second monochrome screen 202 with first light and second light of different colors, two monochrome screens can be disposed without color filter films. However, both the monochrome screens require corresponding driver unit and liquid crystal module. Driver unit of each can control liquid crystal molecules in the corresponding liquid crystal module to deflect by a corresponding angle (the whole is called a first deflection angle or a second deflection angle) according to an obtained display signal (first display signal or second display signal) to present a corresponding transmittance such that light of the corresponding color (first light or second light) extends by a corresponding transmittance to present an image (first image or second image) of the corresponding color on the display carrier 10. The display carrier 10 actually displays the first image and second image of different colors, but human's eyes see an image formed by the stacked first image and second image.

The above monochrome screen can comprise a first substrate and a second substrate disposed oppositely. A driver layer (comprising a plurality of pixel circuits and a plurality of pixel electrodes) can be disposed on a side of the first substrate near the second substrate. A common electrode layer can be disposed on a side of the second substrate near the first substrate. A liquid crystal layer is disposed between the driver layer and the common electrode layer. Each pixel circuit makes the pixel electrode have corresponding pixel voltage respectively according to a data voltage received by the pixel circuit. The common electrode layer can be loaded with a common voltage. liquid crystal molecules in the liquid crystal layer corresponding to a location of each pixel electrode can deflect by a corresponding angle according to the corresponding pixel voltage and common electrode voltage such that monochromatic light is transmitted by a corresponding quantity to present an image of the color of corresponding brightness on the display carrier 10.

Figures 2, 3:
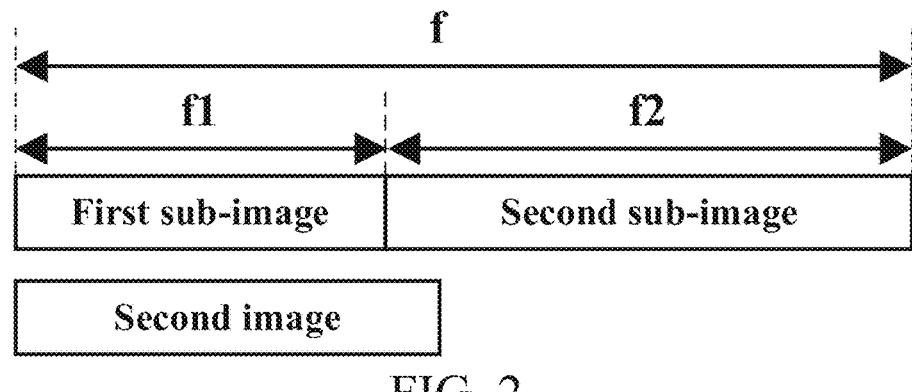
FIG. 2 and FIG. 3 are schematic views of time period division in one frame provided by the embodiment of the present application.

With reference to FIGS. 1 to 3, the first display signal comprises a first sub-display signal and a second sub-display signal. The first light comprises a first sub-light and a second sub-light comprising different colors. The first deflection angle comprises a first sub-deflection angle and a second sub-deflection angle. The second light comprises a third sub-light. A color of the third sub-light is different from any one of the color of the first sub-light and the color of the second sub-light. Namely, the color of at least one of the sub-light in the first light is different from the color of at least one of the sub-light in the second light.

A frame f comprises a first subframe f1 and a second subframe f2. The first monochrome screen 201 is configured to present the first sub-deflection angle according to the first sub-display signal in the first subframe f1, and is configured to present the second sub-deflection angle according to the second sub-display signal in the second subframe f2. The first light source 301 is configured to project the first sub-light extending through the first monochrome screen 201 in the first subframe f1 to display a first sub-image on the display carrier 10, and is configured to project the second sub-light extending through the first monochrome screen 201 in the second subframe f2 to display a second sub-image on the display carrier 10. The first image comprises the first sub-image and the second sub-image.

It can be understood that the present embodiment, by disposing two monochrome screens disposed with light sources respectively comprising individual colors to present images of corresponding colors, can prevent poor brightness of the target image under the circumstance disposing only one white light source. Also, the first light projected to the first monochrome screen 201 comprises the first sub-light and the second sub-light having different colors, and the first display signal affecting the first monochrome screen 201 comprises the first sub-display signal corresponding to the first sub-light and the second sub-display signal corresponding to the second sub-light such that the first subframe f1 and the second subframe f2 in a frame f of the first monochrome screen 201 can respectively cooperatively the first sub-light and the second sub-light to sequentially project the first sub-image and the second sub-image corresponding to different colors to the display carrier 10. Because the first monochrome screen 201 can sequentially present the first sub-image and the second sub-image, one monochrome screen can be omitted to reduce a volume of the display device 20. In the meantime, the second monochrome screen 202 can be affected by the second display signal and cooperatively project the second light including the third sub-light (a color thereof is different from any one of the color of the first sub-light and the color of the second sub-light) to present a second image on the display carrier 10. Human's eyes only sees, in a frame, a color target image stacked by the first image (including the first sub-image and the second sub-image sequentially presented) and the second image.

It should be noticed that the second light can also comprise a fourth sub-light having a color the same as or different from any one of the color of the first sub-light and the color of the second sub-light. In the meantime, the second display signal can also comprise a third sub-display signal and a fourth sub-display signal, and the first deflection angle can also comprise a third sub-deflection angle and a fourth sub-deflection angle. Similarly, the second monochrome screen is configured to the third sub-deflection angle according to the third sub-display signal in the first subframe present, and is configured to present the fourth sub-deflection angle according to the fourth sub-display signal in a second subframe. The second light source is configured to in the first subframe project third sub-light extending through second monochrome screen to display a third sub-image on the display carrier, and is configured to project a fourth sub-light extending through second monochrome screen in a second subframe to a display fourth sub-image on the display carrier. The second image comprises the third sub-image and the fourth sub-image. For ease of descriptions, only the third sub-light in the second light will be used as an example for explanation in the following descriptions.

Of course, with reference to FIGS. 1 to 3, the second monochrome screen 202 is configured to present the second deflection angle in the frame f according to the second display signal. A frame of the first monochrome screen 201 and a frame of the second monochrome screen 202 are synchronous. The second light source 302 is configured to project the third sub-light extending through the second monochrome screen 202 in the frame to display the second image on the display carrier 10. As described above, the second monochrome screen 202 can be only configured to display the second image. Therefore, in a frame f, the second monochrome screen 202 only needs to cooperate with the third sub-light and the second display signal projected by the second light source 302 to display a corresponding second image. In the present embodiment, a value relationship between a time length occupied for presenting the first sub-image and a time length occupied for presenting the second sub-image is not limited, and the time lengths can be equal. In the present embodiment, a time period for presenting the second image can overlap a time period for presenting the first sub-image and a time period for presenting the second sub-image such that the second image overlaps the first sub-image and the second sub-image.

With reference to FIGS. 1 to 3, a refresh rate of the first monochrome screen 201 is equal to or greater than a refresh rate of the second monochrome screen 202. In particular, resolutions and sizes of the first monochrome screen 201 and the second monochrome screen 202 are the same. Namely, sizes and resolutions of the first display image and the second display image can be equal, and in in a frame f, the first monochrome screen 201 needs to be refreshed twice to sequentially display the first sub-image and the second sub-image while the second monochrome screen 202 only needs to be refreshed one time to display the second image. Thus, a refresh rate of the first monochrome screen 201 is greater, and can be equal to a double of a refresh rate of the second monochrome screen 202.

In some embodiments, with reference to FIGS. 1 to 4, the first monochrome screen 201 is affected by the first sub-display signal to be configured to display a quantity of pixels P of the first sub-image, and is affected by the second sub-display signal to be configured to display a quantity of pixels P of the second sub-image. The second monochrome screen 202 is affected by the second display signal to be configured to display a quantity of pixels P of the second image, and the three quantities are equal. Because the quantities of the pixels P for forming the first sub-image, the second sub-image, and the second image are equal. Namely, quantities of pixels emitting light in the three images are the same, thereby lowering a risk of color cast of the target image constituted by the first sub-image, the second sub-image, and the second image.

Furthermore, to improve a size of a display image, the quantity of the pixels P for forming the first sub-image, the second sub-image, and the second image, the quantity of the pixels P of the first monochrome screen 201, and the quantity of the pixels P of the second monochrome screen 202 can be equal. Furthermore, to improve a granularity of the display image, a message amount of each of the first sub-display signal, the second sub-display signal, and the second display signal can be disposed correspondingly according to the quantity of the pixels P of the corresponding first monochrome screen 201 or second monochrome screen 202.

In some embodiments, as shown in FIG. 3, the first subframe f1 comprises a first sub-scan time period C and a first sub-light emitting time period D after the first sub-scan time period C. The second subframe f2 comprises a second sub-scan time period G and a second sub-light emitting time period H after the second sub-scan time period G. With reference to FIGS. 1 and 3, the first monochrome screen 201 is configured to present the first sub-deflection angle according to the first sub-display signal in the first sub-scan time period C, and is configured to present the second sub-deflection angle in the second sub-scan time period G according to the second sub-display signal in the second sub-scan time period G. The first light source 301 is configured to project the first sub-light extending through the first monochrome screen 201 in the first sub-light emitting time period D to display the first sub-image on the display carrier 10, and is configured to project the second sub-light extending through the first monochrome screen 201 in the second sub-light emitting time period H to display the second sub-image on the display carrier 10.

For ease of descriptions, a plurality of pixels arranged along a row direction and a column direction in each of the first monochrome screen 201 and the second monochrome screen 202, and rows of the pixels switching on sequentially are used as an example for explanation. In the first sub-scan time period C, rows of the pixels sequentially switch on (for example, a first row of the pixels switch on in a first time period A and keep switching on in a second time period B after the first time period A. Similarly, the pixels of each row keep switching on after a corresponding time period switches on. Namely, the first sub-scan time period C is a total time period in which the rows of the pixels sequentially switch on. Also, the rows of the pixels are sequentially affected by data voltage sets corresponding to the first sub-display signal. Each of the data voltage sets comprises a plurality of data voltages of the pixels of a corresponding row. After the rows of the pixels sequentially deflect by corresponding deflection angles, namely, at this time, the first monochrome screen 201 deflects by the first sub-deflection angle, then in the first sub-light emitting time period D the first light source 301 switches on to emit and project a first sub-light to the first monochrome screen 201 to display a first sub-image on the display carrier 10. Similarly, in the second sub-scan time period G, the first row of the pixels switches on a third time period E to charge, and keeps switching on in a later fourth time period F, and so on. The rows of the pixels sequentially switch on, and then the first light source 301 switches on in the later second sub-light emitting time period H to emit and project a second sub-light to the first monochrome screen 201 to display a second sub-image on the display carrier 10.

It should be noticed that the present application has no limit to a specific configuration of the first light source 301. With reference to FIG. 1, the first light source 301 can comprise a first sub-light source 3011 emitting first sub-light and a second sub-light source 3012 emitting second sub-light. Of course, the first light source 301 can also be configured to emit the first sub-light and the second sub-light in different time periods. Based on the configuration of FIG. 1, the display device 100 can also comprise a light source control module 60, the light source control module 60 can control the first sub-light source 3011, the second sub-light source 3012, and the second light source 302 in the first light source 301 to transmit time periods of the first sub-light, second sub-light, and third sub-light and intensities (brightness) of the three sub-light, respectively. In particular, the light source control module 60 is configured to control the first light source 30 to project the first sub-light 1 in the first subframe, to project the second sub-light in the second subframe, and is configured to control the second light source 302 to project the third sub-light in the frame.

Similarly, the second monochrome screen 202 in a frame f can also be divided to comprise a second scan time period K and a second light emitting time period L after the second scan time period K. In the second scan time period K, rows of the pixels in the second monochrome screen 202 sequentially switch on, for example, a first row of the pixels switches on in a fifth time period I to charge, and keeps switches on in a later sixth time period J. After the rows of the pixels sequentially switch on, the second light source 302 switches on in the later second light emitting time period L to emit and project second light on the second monochrome screen 202 to display a second image on the display carrier 10.

Figure 4:
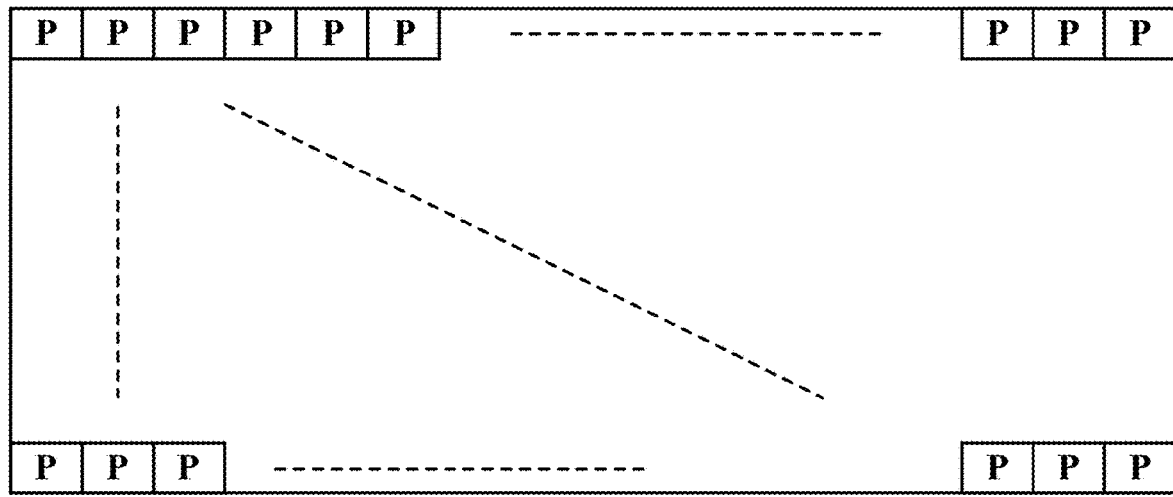
FIG. 4 is a schematic view of a pixel arrangement of a first monochrome screen and a second monochrome screen provided by the embodiment of the present application.
Figure 10:
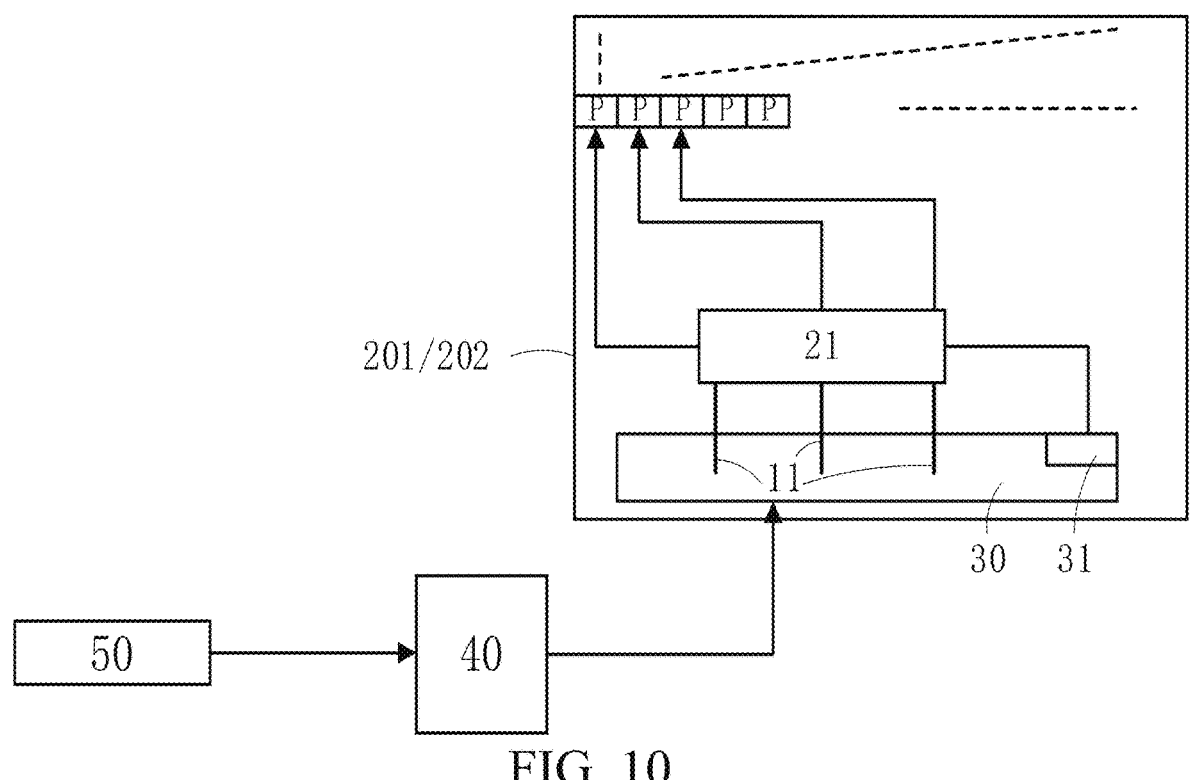
FIG. 10 is a schematic connection view of a plurality of source electrode lines of the display device provided by the embodiment of the present application.
Figure 13:
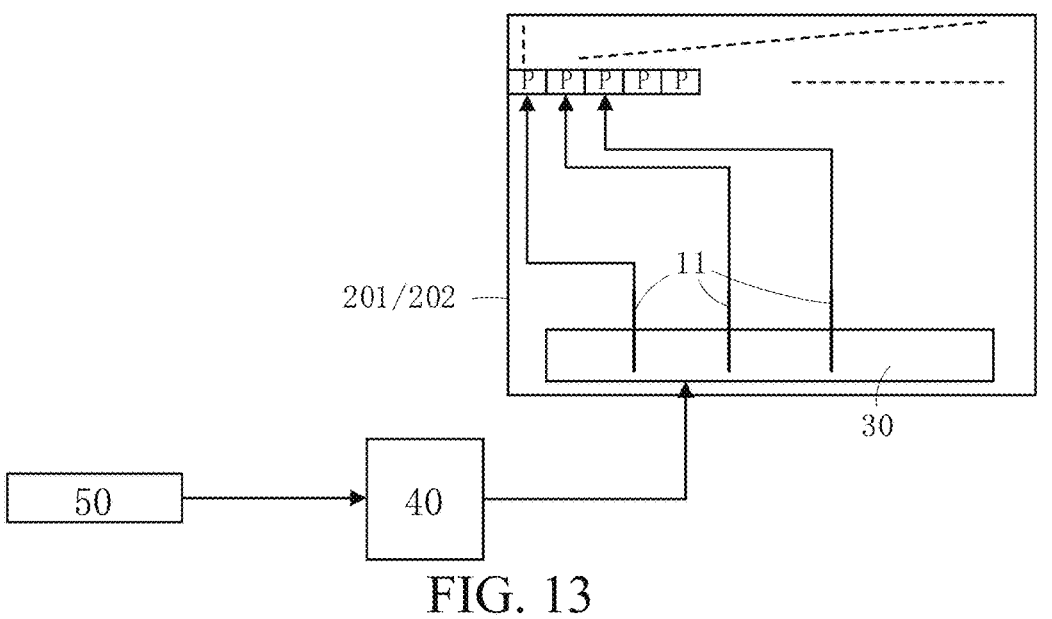
FIG. 13 is a schematic connection view of a plurality of source electrode lines of the display device provided by the embodiment of the present application.

In some embodiments, as shown in FIGS. 1, 5 to 8, the display device 100 further comprises an image process unit 40 configured to obtain an initial display signal and generate the first display signal corresponding to the first monochrome screen 201 and the second display signal corresponding to the second monochrome screen 202 according to the initial display signal. With reference to FIGS. 4, 10, and 13, the first monochrome screen 201 comprises a plurality of pixels P and a driver 30 electrically connected to the pixels P. The driver 30 is configured to obtain a plurality of first sub-display messages of the pixels P corresponding to the first sub-light from the first sub-display signal to obtain a plurality of second sub-display messages of the pixels P corresponding to the second sub-light from the second display signal.

The initial display signal of each frame can comprise a signal corresponding to the first sub-display signal, a signal corresponding to the second sub-display signal, and a signal corresponding to the third sub-display signal. Namely, various display signals of various color sub-light are originally doped in the initial display signal, and required to be processed by the image process unit 40 to be able to respectively affect the first display signal of the first monochrome screen 201 and the second display signal of the second monochrome screen 202.

Figure 5:
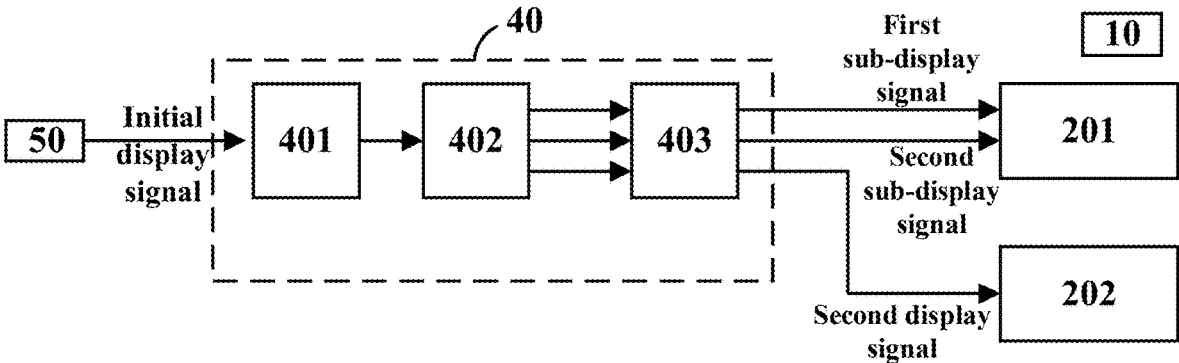
FIGS. 5 to 8 are structural diagrams of the display device provided by the embodiment of the present application.

In particular, as shown in FIG. 5, the image process unit 40 can comprise a buffer 401, a system chip 402 (it can comprise at least one of a system-on chip and a field programmable gate array chip), and an image data flow processor 403. The buffer 401 can obtain an initial display signal of a frame or multiple frames from a video source 50. The system chip 402 can obtain an initial display signal of a frame from the video source 50 and divide the initial display signal into multiple sets of initial display messages according to sub-light of different colors. Each set of the initial display messages can comprise a plurality of initial sub-display messages corresponding to a plurality of pixels P. Each initial sub-display message corresponds to a deflection angle by which the pixels P needs to deflect corresponding to the sub-light. Furthermore, the image data flow processor 403 can sort and connect the initial sub-display messages of each set of the initial display messages according to a transmission sequence to the pixels P to form corresponding display signals (first sub-display signals, second sub-display signals, or second display signals).

Figure 6:
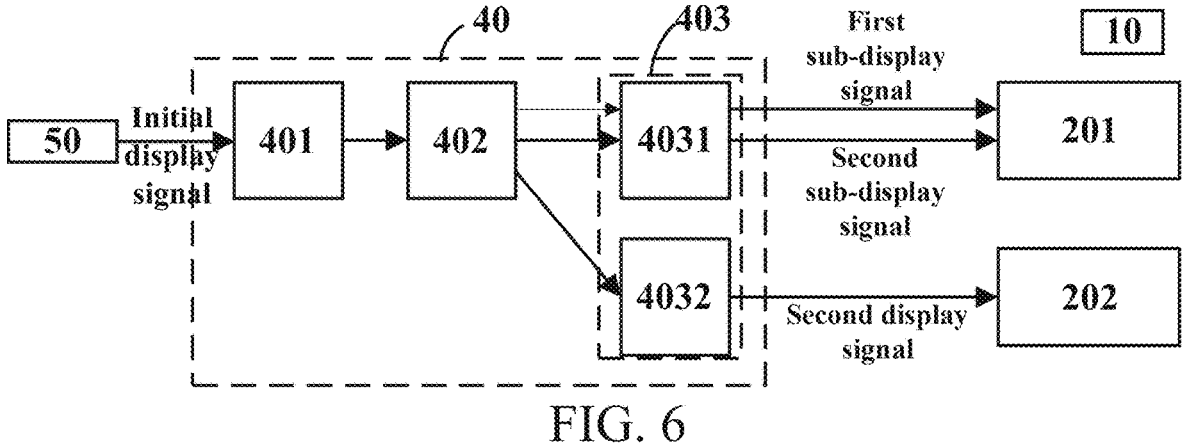

Furthermore, as shown in FIG. 6, the quantity of the image data flow processor 403 can be multiple, here uses two as an example for explanation, respectively a first image data flow processor 4031 and a second image data flow processor 4032. The first image data flow processor 4031 can obtain two sets of initial display messages corresponding to two colors (color 1, color 2, no limit is applied to specific colors of the two colors) corresponding to the first light source 301 from the system chip 402 and process the messages to generate a first sub-display signal and a second sub-display signal. The second image data flow processor 4032 can obtain a set of initial display messages corresponding to a color corresponding to the second light source 302 from the system chip 402 and process the messages to generate a second display signal. Because the two image data flow processors 403 can process their own initial display messages respectively, a total processing speed can be improved.

Figure 7:
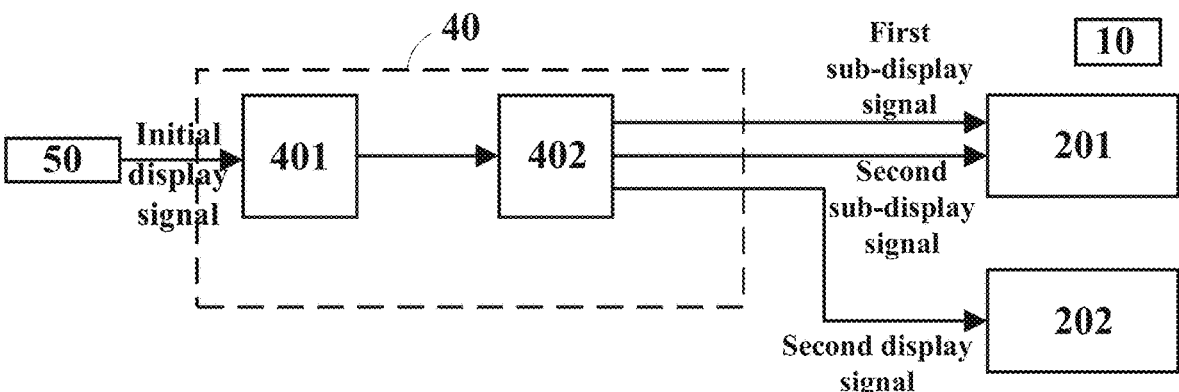
Figure 8:
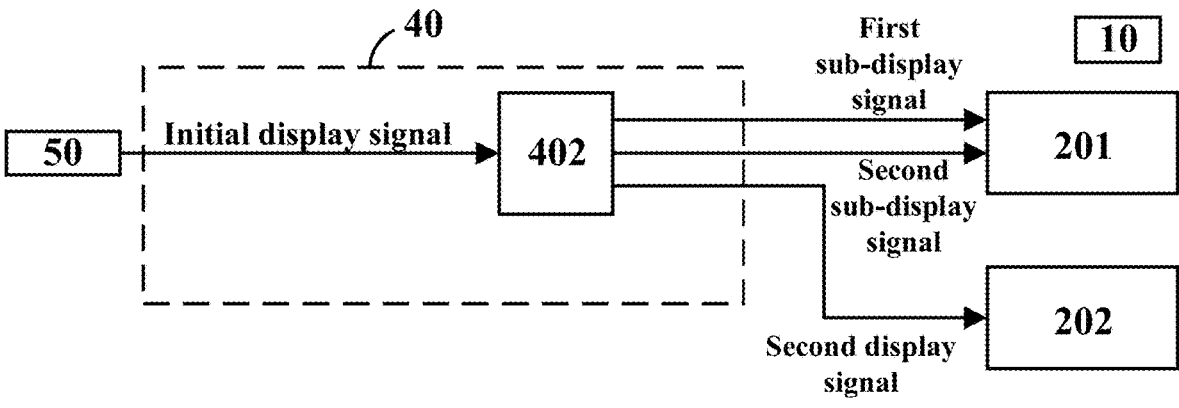

Of course, as shown in FIG. 7, on the basis of FIG. 4 or 5, functions of the image data flow processor 403 are integrated in the system chip 402 to avoid individually manufacturing the image data flow processor 403. Furthermore, as shown in FIG. 8, on the basis of FIG. 7, functions of the buffer 401 are integrated in the system chip 402 to avoid individually manufacturing the buffer 401.

It should be noticed that the above initial display signal, initial sub-display message, first sub-display signal, second sub-display signal, and second display signal can be gray-scale signals. Namely, the stored data represents a plurality of grayscale values of pixels P under sub-light of a corresponding color, and can be converted into a corresponding data signal by the driver 30 in the monochrome screen. The data signal can comprise a plurality of data voltages corresponding to the pixels P to finally affect a plurality of pixels P.

For ease of descriptions, here a message amount of the initial display signal being 1920RGB*1080 is used as an example for explanation. Namely, the monochrome screen comprises 1920 columns, 1080 rows of pixels P, and the initial display signal corresponds to R, G, B, three sets of initial display messages. Each set of the initial display messages comprises 1920*1080 initial sub-display messages corresponding to the 1920*1080 pixels P.

On the basis of the initial display signal of each frame comprising 3*1920*1080 initial sub-display messages arranged by a format of (R1, G1, B1), (R2, G2, B2), (R3, G3, B3) . . . to (R2,073,600, G2,073,600, B2,073,600), the first sub-display signal generated accordingly comprises 1920*1080 first sub-display messages (R1, R2 . . . to R2,073,600) corresponding to the first sub-light (for example, red), and the second sub-display signal comprises 1920*1080 second sub-display messages (G1, G2 . . . to G2,073,600) corresponding to the first sub-light (for example, green). 1920*1080 pixels P in the first monochrome screen 201 in a frame, at different times, are affected by "R1, R2 . . . to R2,073,600" to present the first sub-deflection angle and are affected by "G1, G2 . . . to G2,073,600" to present the second sub-deflection angle to cooperate with the first sub-light and the second sub-light at different times to display the red first sub-image and the green second sub-image at different times.

Similarly, the second display signal generated according to the initial display signal comprises 1920*1080 initial sub-display messages (B1, B2 . . . to B2,073,600) corresponding to the third sub-light (for example, blue). 1920*1080 pixels P in the second monochrome screen 202 in a frame are affected by "B1, B2 . . . to B2,073,600" to present a second deflection angle to cooperate with the third sub-light to display the blue second image.

In some embodiments, with reference to FIGS. 5 to 9, the image process unit 40 is configured to parse the initial display signal to form the first sub-display messages (R1, R2 . . . to R2,073,600) and the second sub-display messages (G1, G2 . . . to G2,073,600). The image process unit 40 is further configured to correspondingly fill a first subfill message M1 and a second subfill message M2 after each of the first sub-display messages (each of R1, R2 . . . to R2,073,600) to correspondingly form a first sub-display message set ((R1,M1, M2), 1≤i≤2,073,600), and is configured to correspondingly fill a third subfill message M3 and a fourth subfill message M4 after each of the second sub-display messages (each of G1, G2 . . . to G2,073,600) to correspondingly form a second sub-display message set ((Gi,M3, M4), 1≤i≤2,073,600). The image process unit 40 is further configured to correspondingly generate the first sub-display signal (including (R1,M1, M2), (R2,M1, M2) . . . to (R2,073,600,M1, M2)) according to the first sub-display message set, and is configured to correspondingly generate the second sub-display signal (including (G1,M3, M4), (G2,M3, M4) . . . to (G2,073,600,M3, M4)) according to the second sub-display message set.

Figure 9:
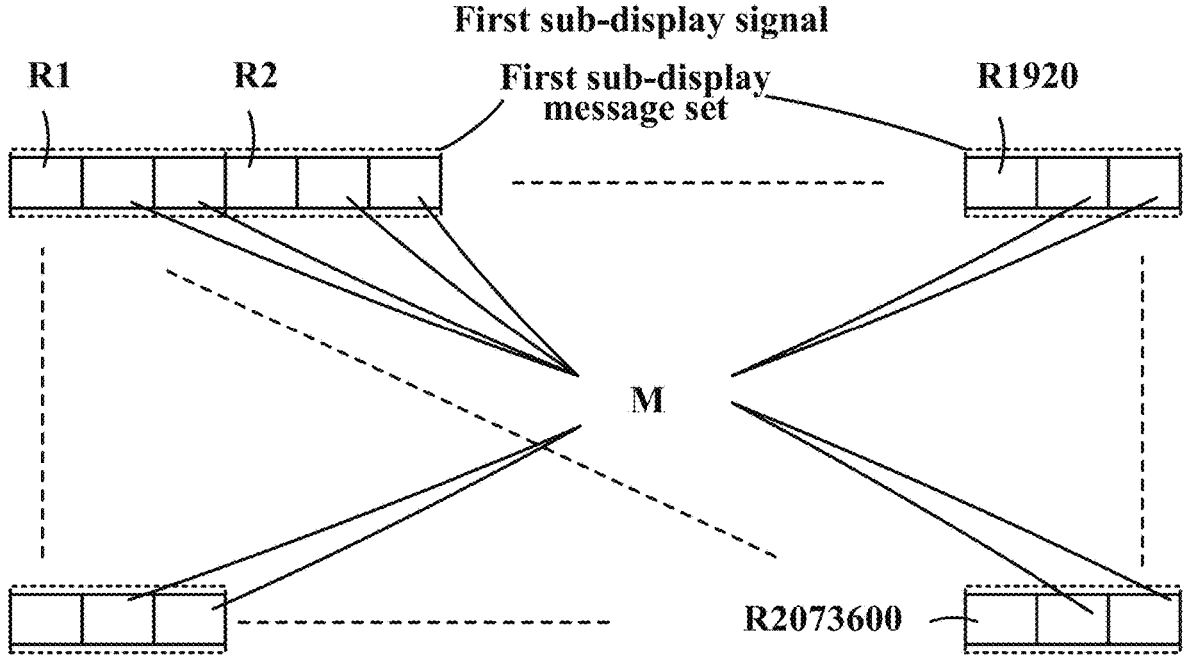
FIG. 9 is a schematic view of detailed contents of a first sub-display signal and a second sub-display signal of the first monochrome screen provided by the embodiment of the present application.
Figure 9:
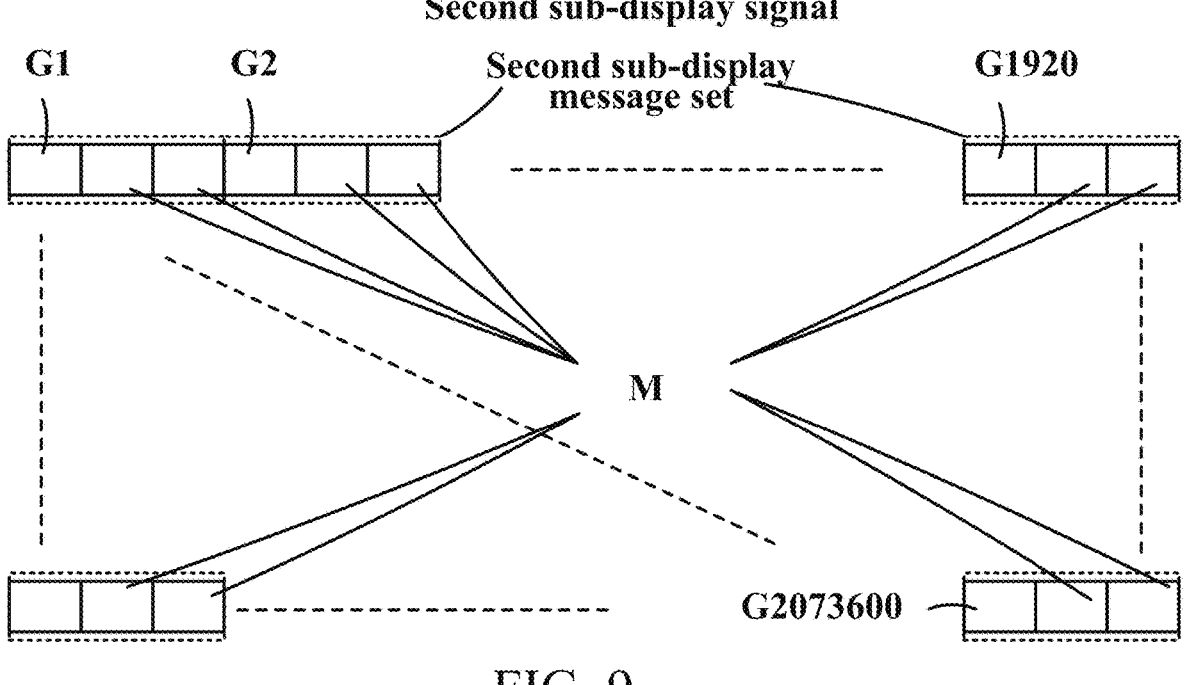

For convenience of illustration, the above M1, M2, M3, M4 in the same subfill message M are used as an example for explanation, FIG. 9 illustrates detailed contents of the first sub-display signal and detailed contents of the second sub-display signal formed by the image process unit 40 through the above data processing method. It should be noticed that 2,073,600 first sub-display message sets in the first sub-display signal can be arranged continuously, data (for spacing) can be disposed or not disposed between adjacent two or rows of the first sub-display message sets. The second sub-display signal and the second display signal can be disposed similarly.

Figure 11:
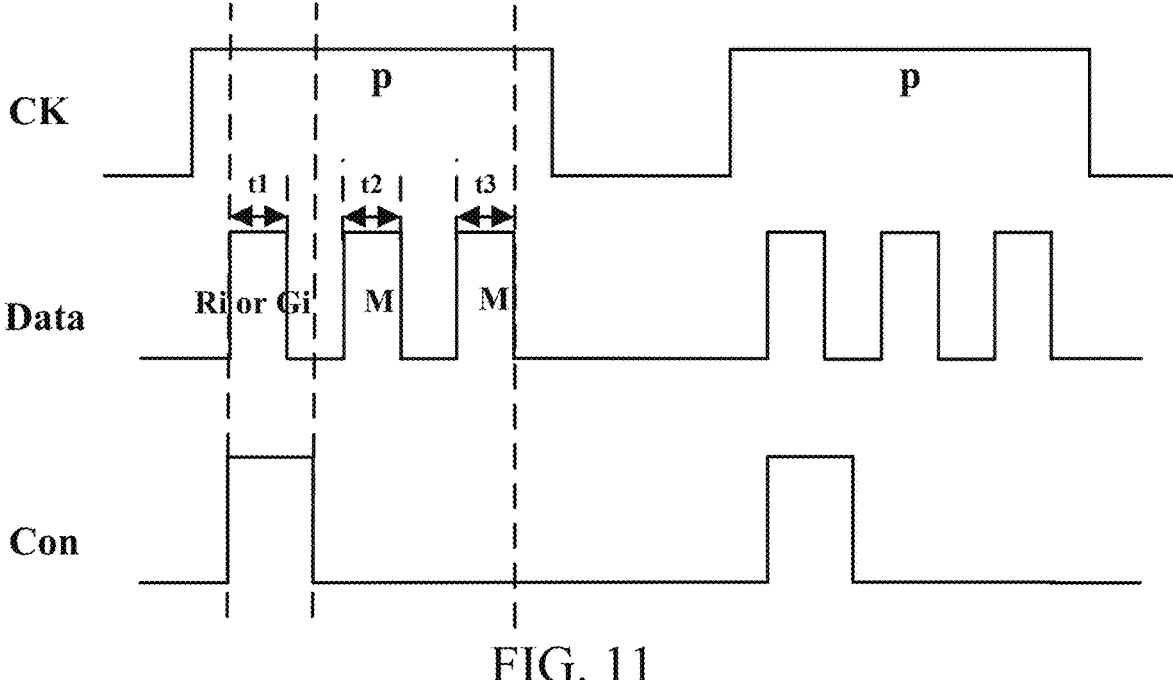
FIG. 11 and FIG. 12 are waveform diagrams of some signals provided by the embodiment of the present application.
Figure 12:
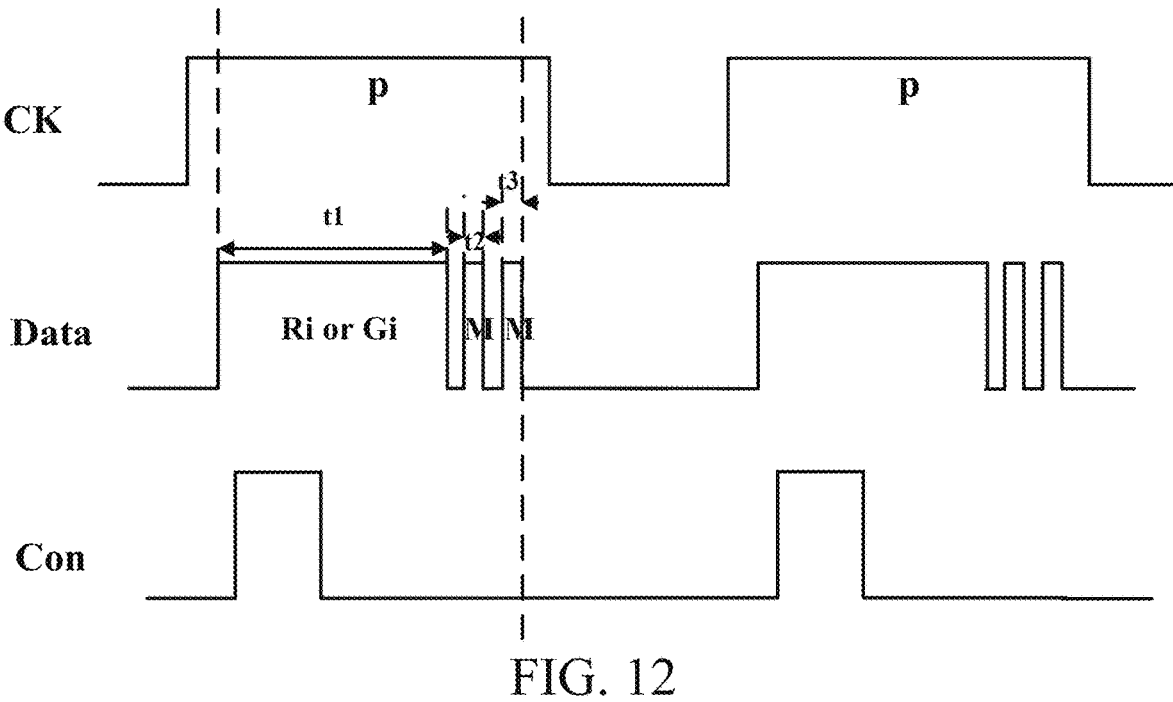

In some embodiments, on the basis of the data processing method of the image process unit 40 as shown in FIG. 9, with reference to FIG. 10, the first monochrome screen 201 further comprises a plurality of source electrode lines 11 and a switch element 21. The driver 30 is electrically connected to the source electrode lines 11. Each of the source electrode lines 11 are connected to a corresponding one of the pixels P through the switch element 21. As shown in FIG. 4, the pixels are divided into a plurality of pixel sets (for example, dividing according to rows), and each of the pixel sets comprises corresponding ones of the pixels (for example, the pixels in the same row). With reference to FIGS. 11 and 12, a switch-on time period of each of the pixel sets comprises a first time period t1, a second time period t2, and a third time period t3. In each of the first time periods t1, the switch element 21 is closed (controlled by an effective pulse of a control signal Con, and can be generated by a switch control module 31 in the driver 30), the source electrode lines 11 are configured to output the first sub-display messages (including (R(1920*j+1),M, M), (R(1920*j+2),M, M) . . . to (R(1920*j+1920),M, M), O_j≤(total row quantity−1)) in the first sub-display message sets corresponding to a corresponding one of the pixel sets or the second sub-display messages (including (G(1920*j+1),M, M), (G(1920*j+2),M, M) . . . to (G(1920*j+1920),M, M), O_j≤(total row quantity−1)) in the second sub-display message sets corresponding to a corresponding one of the pixel sets. A specific content is determined according to a current first subframe or second subframe. In each of the second time periods t2 (controlled by an invalid level of the control signal Con), the switch element 21 is disconnected, the source electrode lines 11 are configured to output the first subfill messages M1 in the first sub-display message sets corresponding to a corresponding one of the pixel sets or the third subfill messages M3 in the second sub-display message sets corresponding to a corresponding one of the pixel sets. In each of the third time periods t3, the switch element 21 is disconnected, the source electrode lines 11 are configured to output the second subfill messages M2 in the first sub-display message sets corresponding to a corresponding one of the pixel sets or the fourth subfill messages M4 in the second sub-display message sets corresponding to a corresponding one of the pixel sets. A specific content can be determined according to the current first subframe or second subframe.

With reference to FIGS. 11 to 12, a clock signal CK can comprise a plurality of clock pulses p. In the first subframe, each of the clock pulses p can be configured to control pixels P of a corresponding row to switch on such that the source electrode lines 11 transmit data voltages (generated according to corresponding first sub-display messages) corresponding to the current switching-on rows to the pixels P of the row. One row blanking time period can be disposed between adjacent two of the clock pulses p, and so on. The pixels P of multiple rows in the first monochrome screen 201 sequentially switch on such that liquid crystal molecules on corresponding locations complete deflection (a deflection degree relates to a corresponding data voltage) respectively to present a first deflection angle as a whole. Similarly, in a second subframe, along with the rows of the pixels P sequentially switching on, a plurality of the source electrode lines 11 transmit data voltages (generated according to corresponding second sub-display messages) corresponding to the current switching-on row to the pixels P of the row to present a second sub-deflection angle as a whole. Similarly, in the frame, the second monochrome screen 202 can also have the rows of the pixels P sequentially switching on to present a second deflection angle as a whole. However, because of a lower refresh rate, a switch-on time length of each row of the pixels P can be disposed greater, or the switch-on time length of each row of the pixels P is the same as that of the first monochrome screen, but have an additional maintaining frame to maintain the second deflection angle.

It can be understood that for a requirement of the driver 30 in a row direction resolution (required to reach a data quantity of original 1920RGB*1080), the present embodiment here can fill R1, R2 . . . to R2,073,600 corresponding to the first subframe as "(R1, M, M), (R2, M, M), (R3, M, M) (R2,073,600, M, M)". Similarly, G1, G2 . . . to G2,073, 600 corresponding to the second subframe can be filled as a format of "(G1, M, M), (G2, M, M), (G3, M, M) . . . (G2,073,600, M, M)". Similarly, the second monochrome screen 202 can also fill B1, B2 . . . to B2,073,600 corresponding to the frame as a format of "(B1, M, M), (B2, M, M), (B3, M, M) . . . (B2,073,600, M, M)".

The above M can correspond to a black frame insertion voltage, and, if transmitted to corresponding pixels P, would make corresponding liquid crystal molecules perform invalid deflection resulting in sub-light unable to pass through such location, as shown in FIGS. 11 and 12. In the present embodiment, because the source electrode lines 11 (loaded with a data signal Data) p sequentially outputs "Ri or Gi", "M", and "M" in the clock pulse, to prevent M from influencing the deflected angles of corresponding pixels P, the control signal Con is disposed to have invalid level in the second time period t2 and the third time period t3 to electrically disconnect the source electrode lines 11 in corresponding ones of the pixels P.

Furthermore, as shown in FIG. 12, in each of the first subframe and the second subframe of the first monochrome screen 201, the time length of the first time period t1 is greater than any one of the time length of the second time period t2 and the time length of the third time period t3. Because the source electrode lines 11 only transmit "Ri or Gi" for controlling corresponding ones of the pixels P in the first time period t1 to perform effective deflection, disposing a greater time length of the first time period t1 makes corresponding data voltages are sufficiently loaded to the corresponding pixels P. Similarly, three corresponding sub-time periods in the second monochrome screen 202 can also refer to the above configuration.

Figure 17:
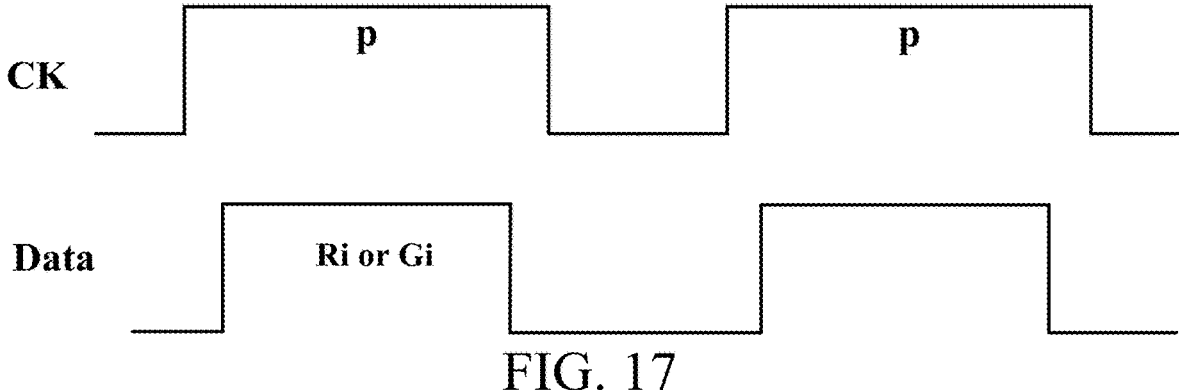
FIG. 17 is a waveform diagram of some signals provided by the embodiment of the present application.

In another some embodiments, on the basis of a data processing method of the image process unit 40 as shown in in FIG. 9, with reference to FIG. 13, the first monochrome screen 201 further comprises a plurality of source electrode lines 11. The driver 30 is constantly connected to corresponding ones of the pixels P by corresponding ones of the source electrode lines 11. As shown in FIG. 17, a switch-off time period (namely, the above row blanking time period) is disposed correspondingly after the switch-on time period of each of the pixel sets P. Each of the switch-off time periods comprises a fourth time period t4 and a fifth time period t5. In the switch-on time period of each of the pixel sets (corresponding to the clock pulses p), the source electrode lines 11 are configured to output the first sub-display messages (including (R(1920*j+1),M, M), (R(1920*j+2), M, M) . . . to (R(1920*j+1920),M, M), 0≤j≤(total row quantity−1)) in the first sub-display message sets corresponding to a corresponding one of the pixel sets or the second sub-display messages (including (G(1920*j+1),M, M), (G(1920*j+2),M, M) . . . to (G(1920*j+1920),M, M), 0_j≤(total row quantity−1)) in the second sub-display message set corresponding to a corresponding one of the pixel sets. In each of the fourth time period t4, the source electrode lines 11 are configured to output the first subfill messages M1 (for example, M) in the first sub-display message sets corresponding to a corresponding one of the pixel sets or the third subfill messages M3 (for example, M) in the second sub-display message set corresponding to a corresponding one of the pixel sets. In each of the fifth time period t5, the source electrode lines 11 are configured to output the second subfill messages M2 (for example, M) in the first sub-display message sets corresponding to a corresponding one of the pixel sets or the fourth subfill messages M4 (for example, M) in the second sub-display message set corresponding to a corresponding one of the pixel sets.

Figure 14:
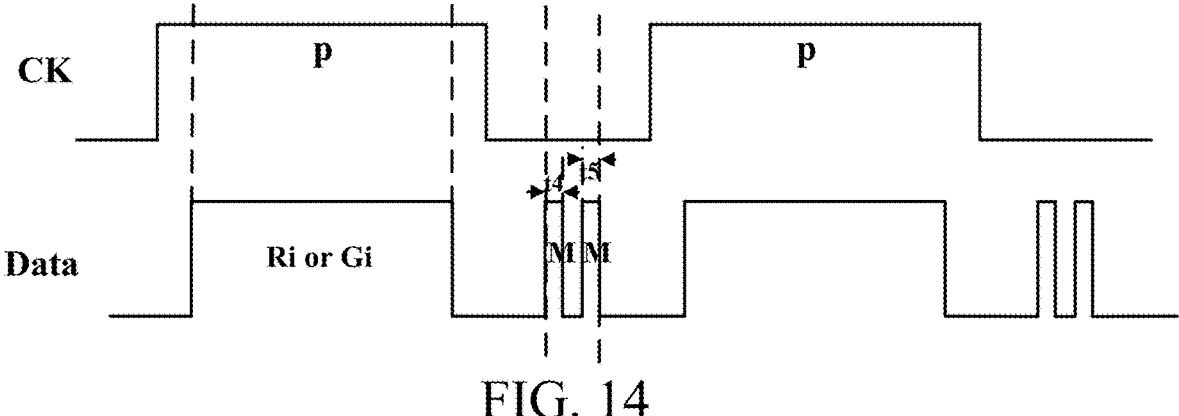
FIG. 14 is a waveform diagram of some signals provided by the embodiment of the present application.

A difference of the present embodiment from the embodiment of FIGS. 10 to 12 is that because no switch element 21 is disposed in the present embodiment (with reference to FIGS. 13 and 14), "Ri or Gi", "M", and "M" sequentially outputted by the source electrode lines 11 (loaded with a data signal Data) would be inputted into corresponding ones of the pixels P. When M corresponds to a black frame insertion voltage, the driver 30 can be controlled to sequentially output two black frame insertion voltages corresponding to "M" and "M" only in the switch-off time period of the pixel sets P to avoid the pixels P from influence by the black frame insertion voltages. In particular, because at this time, the switch-on time period of the pixel sets P is only configured to output "Ri or Gi", to improve a charging effect to the pixels P, a time period configured to output a data voltage corresponding to "Ri or Gi" can be disposed to be sufficiently large, and a maximum time period can be equal to a pulse width of the clock pulses p.

Of course, M1 and M2 filled after each of the first sub-display messages (each of R1, R2 . . . to R2,073,600) can be the same as corresponding ones of the first sub-display messages, different from those in FIGS. 11 and 12, the control signal Con can be disposed to be effective pulse in the clock pulses p such that first sub-display messages, M1, and M2 sequentially outputted by the source electrode lines 11 are outputted to corresponding ones of the pixels P, which can also omit the switch element 21. Namely, the source electrode lines 11 can be constantly connected to corresponding ones of the pixels P. Similarly, the second sub-display signal and second display signal can also refer to the above configuration.

In some embodiments, with reference to FIGS. 5 to 8 and 15, the image process unit 40 is configured to parse the initial display signal to form a plurality of first sub-display messages (R1, R2 to R2,073,600) and a plurality of second sub-display messages (G1, G2 to G2,073,600). The image process unit 40 is further configured to arrange the first sub-display messages to correspondingly form a plurality of first sub-display message sets (each is (Ri, R(i+1), R(i+2)), 1≤i≤2,073,600−2), and is configured to arrange the second sub-display messages to correspondingly form a plurality of second sub-display message set (each is (Gi, G(i+1), G(i+2)), 1≤i≤2,073,600−2). The image process unit 40 is further configured to correspondingly generate the first sub-display signal (comprising (R1, R2, R3), (R4, R5, R6) . . . to (R2073658, R2073659, R2,073,600)) according to the first sub-display message set, and is configured to correspondingly generate the second sub-display signal (comprising (G1, G2, G3), (G4, G5, G6) . . . to (G2073658, G2073659, G2,073,600)) according to the second sub-display message set.

Figure 15:
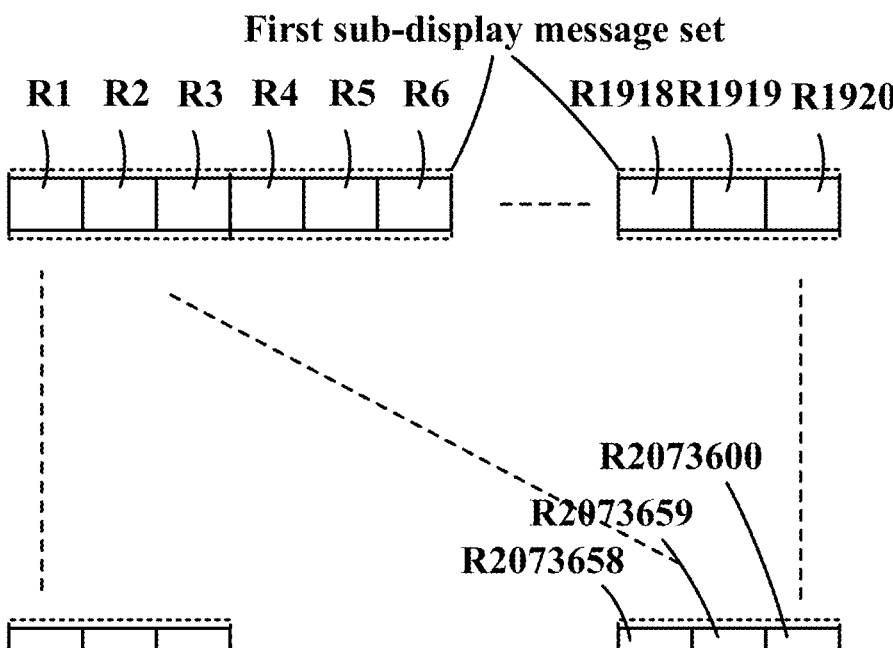
FIG. 15 and FIG. 16 are schematic views of detailed contents of a first sub-display signal and a second sub-display signal of a first monochrome screen provided by the embodiment of the present application.
Figure 15:
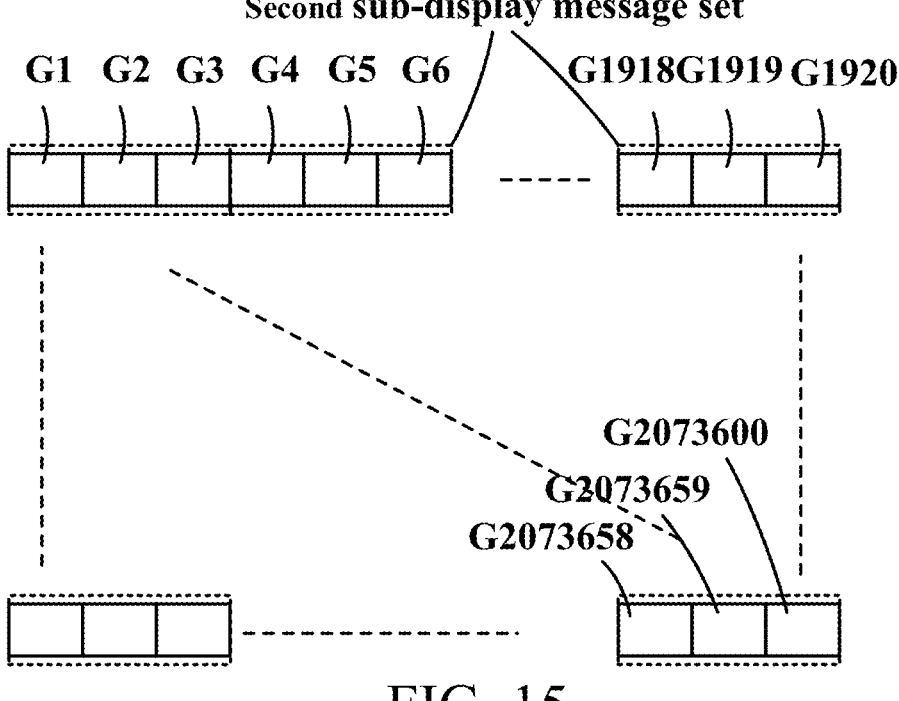

FIG. 15 illustrates detailed contents of the first sub-display signal and detailed contents of the second sub-display signal formed by the image process unit 40 through the above data processing method. It should be noticed that (2,073,600/3) first sub-display message sets in the first sub-display signal can be arranged continuously, and data (for spacing) can be disposed or not disposed between adjacent two or rows first sub-display message set. The second sub-display signal and the second display signal can be disposed similarly.

In another some embodiments, with reference to FIGS. 5 to 8 and 16, on the basis of formation of a plurality of first sub-display message sets (each is (Ri, R(i+1), R(i+2)), 1≤i≤2,073,600−2) and a plurality of second sub-display message set (each is (Gi, G(i+1), G(i+2)), 1≤i≤2,073,600−2), furthermore, the image process unit 40 is further configured to divide the first sub-display message sets into a plurality of first message sets (each is ([R(1920*j+1), R(1920*j+2), R(1920*j+3)], [R(1920*j+4), R(1920*j+5), R(1920*j+6)] . . . to [R(1920*j+1918), R(1920*j+1919), R(1920*j+1920)], 0≤j≤(total row quantity−1)) corresponding to a plurality of pixel sets (for example, corresponding to rows of the pixels P), and divide the second sub-display message set into a plurality of second message sets ([G(1920*j+1), G(1920*j+2), G(1920*j+3)], [G(1920*j+4), G(1920*j+5), G(1920*j+6)] . . . to [G(1920*j+1918), G(1920*j+1919), G(1920*j+1920)], 0_j_(total row quantity−1)) corresponding to the pixel sets. The image process unit 40 is further configured to correspondingly fill a first fill message set (including (920*2) M1 arranged sequentially) after each of the first message sets to correspondingly form a third message set, and correspondingly fill a second fill message set (including (920*2) M2 arranged sequentially) after each of the second message sets to correspondingly form a fourth message set. The image process unit 40 is further configured to correspondingly generate the first sub-display signal according to the third message sets, and is configured to correspondingly generate the second sub-display signal according to the fourth message sets.

Figure 16:
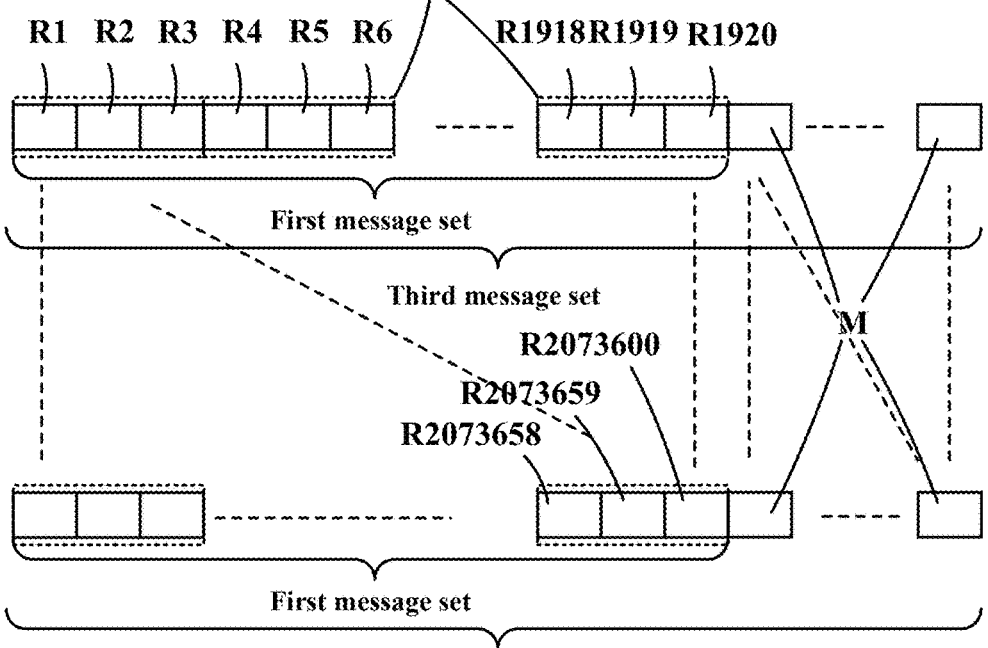

For convenience of illustration, the above M1 and M2 being the same subfill message M is used as an example for explanation. FIG. 16 illustrates detailed contents of the first sub-display signal and detailed contents of the second sub-display signal formed by the image process unit 40 through the above data processing method. It should be noticed that 2,073,600 first sub-display message sets in the first sub-display signal can be arranged continuously, data (for spacing) can be disposed or not disposed between adjacent two or rows first sub-display message set. The second sub-display signal and the second display signal can be disposed similarly.

A difference of the first sub-display signal in FIGS. 15 and 16 is that in FIG. 15 a first fill message set (data quantity thereof is twice the first message set) is filled after the first message set of each row of pixels such that a data quantity (triple of a data quantity of the first message sets) of a third message set obtained after the filling is equal to a data quantity of 1920RGB. The third message set can comprise "M1 of [R(1920*j+1), R(1920*j+2), R(1920*j+3)], [R(1920*j+4), R(1920*j+5), R(1920*j+6)] . . . to [R(1920*j+1918), R(1920*j+1919), R(1920*j+1920)]+ (920*2)". The second sub-display signal and the second display signal can be disposed similarly. Although a data filling method thereof is different from that in FIG. 9, both the final first sub-display signals comprise data quantities of 1920RGB. Similarly, the requirement of the driver 30 in the row direction resolution can be fulfilled.

In some embodiments, based on the data processing method for the image process unit 40 as shown in FIGS. 15 and 16, with reference to FIG. 13, the first monochrome screen 201 further comprises a plurality of source electrode lines 11. the driver 30 by corresponding ones of the source electrode lines 11 is constantly connected electrically to corresponding ones of the pixels P. As shown in FIG. 4, the pixels P are divided into a plurality of pixel sets, and each of the pixel sets comprises corresponding ones of the pixels P. As shown in FIG. 17, in the switch-on time period of each of the pixel sets (corresponding to the clock pulses p), the source electrode lines 11 are configured to output the first sub-display message sets (namely, corresponding first message sets) corresponding to a corresponding one of the pixel sets or the second sub-display message set (namely, corresponding second message sets) corresponding to a corresponding one of the pixel sets.

For the data processing method of the image process unit 40 as shown in FIG. 15, because M is not filled after each "Ri or Gi", in a switch-on time period (corresponding to the clock pulses p) of each of the pixel sets, each of the source electrode lines 11 (loaded with a data signal Data) only outputs a data voltage corresponding to "Ri or Gi", the source electrode lines 11 outputs data voltages corresponding to the first message sets (respectively outputting R(1920*j+1), R(1920*j+2), R(1920*j+3) . . . to R(1920*j+1920)]) or the second message sets (respectively outputting G(1920*j+1), G(1920*j+2), G(1920*j+3)] . . . to G(1920*j+1920)]). Similarly, to improve a charging effect to the pixels P, a time period configured to output a data voltage corresponding to "Ri or Gi" can be disposed sufficiently large, and the maximum time period can be equal to a pulse width of the clock pulses p, and so on. The pixels P, as a whole, present a first sub-deflection angle in the first subframe, and present a second sub-deflection angle in a second subframe. The data processing method and the data voltage outputting method of the second monochrome screen 202 can also be disposed similarly.

Compared to FIG. 15, although, in FIG. 16, a first fill message set is filled correspondingly after each of the first message sets to form the third message set, the driver 30 can only select some first message sets in the first subframe to control each of the source electrode lines 11 to only output a data voltage corresponding to Ri in a switch-on time period of the corresponding pixel P. Similarly, the driver 30, in a second subframe, controls each of the source electrode lines 11 to only outputs a data voltage of a corresponding Gi in a switch-on time period of a corresponding pixel P. The data processing method and the data voltage outputting method the second monochrome screen 202 can also be disposed similarly.

The embodiment of the present application also provides a display device driving method. In combination with the descriptions related to FIG. 1, the display device 100 comprises the above display carrier 10, the above first monochrome screen 201, the above second monochrome screen 202, the above first light source 301, and the above second light source 302. The first display signal comprises the above first sub-display signal and the above second sub-display signal. The first light comprises the above first sub-light and the above second sub-light having different colors. The first deflection angle comprises the above first sub-deflection angle and the above second sub-deflection angle. A frame comprises the above first subframe and the above second subframe, as shown in FIG. 18. The method comprises but is not limited to the following steps and a combination thereof.

A step S1 comprises controlling the first monochrome screen to present the first sub-deflection angle in the first subframe according to the first sub-display signal, and controlling the first light source in the first subframe to project the first sub-light extending through the first monochrome screen to display a first sub-image on the display carrier.

Related technical features can refer to the above related descriptions. An implementation main body for "controlling the first monochrome screen to present the first sub-deflection angle according to the first sub-display signal in the first subframe" can be but is not limited to the above driver 30. The first sub-display signal can be generated by the above image process unit 40. An implementation main body for "controlling the first light source to project the first sub-light extending through the first monochrome screen in the first subframe" can be but is not limited to the above light source control module 60.

A step S2 comprises controlling the first monochrome screen to present the second sub-deflection angle according to the second sub-display signal in a second subframe, and controlling the first light source to project the second sub-light extending through the first monochrome screen in the second subframe to display a second sub-image on the display carrier, wherein the first image comprises the first sub-image and the second sub-image.

Similarly, related technical features can refer to the above related descriptions. An implementation main body for "controlling the first monochrome screen to present the second sub-deflection angle in a second subframe according to the second sub-display signal" can be but is not limited to the above driver 30. The second sub-display signal can be generated by the above image process unit 40. An implementation main body for "controlling the first light source in the second subframe to project the second sub-light extending through the first monochrome screen" can be but is not limited to the above light source control module 60.

A step S3 comprises controlling the second monochrome screen to present a second deflection angle according to a second display signal in the frame, and controlling the second light source to project a third sub-light extending through the second monochrome screen in the frame to display a second image on the display carrier, wherein a color of the first light is different from a color of the second light, the first image and the second image make the display carrier to present a target image, and a frame of the first monochrome screen and a frame of the second monochrome screen are synchronous.

Similarly, related technical features can refer to the above related descriptions. an implementation main body for "controlling the second monochrome screen in the frame according to a second display signal to present a second deflection angle" can be but is not limited to the above driver 30. The second display signal can be generated by the above image process unit 40. An implementation main body for "controlling the second light source in the frame to project third sub-light extending the second monochrome screen" can be but is not limited to the above light source control module 60.

The present application provides a display device and a driving method thereof. A first monochrome screen configured to present first deflection angle according to a first display signal, a second monochrome screen configured to present a second deflection angle according to a second display signal are disposed. A frame comprising a first subframe and a second subframe. The first monochrome screen presents the first sub-deflection angle in the first subframe according to the first sub-display signal, and cooperates with a first sub-light source to project a first sub-light extending through the first monochrome screen in the first subframe to display a first sub-image on the display carrier. The first monochrome screen presents the second sub-deflection angle in the second subframe according to the second sub-display signal, and cooperates with a second sub-light source to project a second sub-light extending through the first monochrome screen in the second subframe to display a second sub-image on the display carrier. Also, a second light source is configured to project a third sub-light (a color thereof is different from that of the first sub-light and second sub-light) extending through the second monochrome screen to display a second image on the display carrier. The first sub-image, the second sub-image, and the second image commonly constitute a target image of a frame to achieve both compact volume and high brightness of the display device.

The display device and the driving method thereof provided by the embodiment of the present application are described in detail as above. The principles and implementations of the present application are described in the following by using specific examples. The description of the above embodiments is only for assisting understanding of the technical solutions of the present application and the core ideas thereof. Those of ordinary skill in the art should understand that they can still modify the technical solutions described in the foregoing embodiments or equivalently replace some of the technical features. These modifications or replacements do not make the essence of the technical solutions depart from a range of the technical solutions of the embodiments of the present application.

The invention claimed is:

1. A display device, comprising:
a display carrier;
a first monochrome screen configured to receive a first display signal;
a second monochrome screen configured to receive a second display signal;
a first light source configured to project a first light extending through the first monochrome screen and cooperate with the first display signal to display a first image on the display carrier; and
a second light source configured to project a second light extending through the second monochrome screen and cooperate with the second display signal to display a second image on the display carrier, wherein the first image and the second image are combined to present a target image on the display carrier;
wherein the first display signal comprises a first sub-display signal and a second sub-display signal, and the first sub-light and second sub-light comprise different colors;

wherein the second light comprises a third sub-light, a color of the third sub-light is different from any one of a color of the first sub-light and the color of the second sub-light;

wherein a frame comprises a first subframe and a second subframe, the first monochrome screen is configured to receive the first sub-display signal in the first subframe and receive the second sub-display signal in the second subframe;

wherein the first light source is configured to project the first sub-light extending through the first monochrome screen in the first subframe and cooperate with the first sub-display signal to display a first sub-image on the display carrier, and is configured to project the second sub-light extending through the first monochrome screen in the second subframe and cooperate with the second sub-display signal to display a second sub-image on the display carrier, and the first image comprises the first sub-image and the second sub-image;

wherein the second monochrome screen is configured to receive the second display signal in the frame, and the frame of the first monochrome screen and the frame of the second monochrome screen are synchronous;

wherein the second light source is configured to project the third sub-light extending through the second monochrome screen in the frame and cooperate with the second display signal to display the second image on the display carrier;

wherein the first subframe comprises a first sub-scan time period and a first sub-light emitting time period after the first sub-scan time period, and the second subframe comprises a second sub-scan time period and a second sub-light emitting time period after the second sub-scan time period;

wherein the first monochrome screen is configured to receive the first sub-display signal in the first sub-scan time period and receive the second sub-display signal in the second sub-scan time period;

wherein the first light source is configured to project the first sub-light extending through the first monochrome screen in the first sub-light emitting time period to display the first sub-image on the display carrier, and is configured to project the second sub-light extending through the first monochrome screen in the second sub-light emitting time period to display the second sub-image on the display carrier.

2. The display device according to claim 1, wherein the first monochrome screen is affected by the first sub-display signal to be configured to display a quantity of pixels of the first sub-image and is affected by the second sub-display signal to be configured to display a quantity of pixels of the second sub-image, the second monochrome screen is affected by the second display signal to be configured to display a quantity of pixels of the second image, and the three quantities are equal.

3. The display device according to claim 1, further comprising:

an image process unit configured to obtain an initial display signal and generate the first display signal corresponding to the first monochrome screen and the second display signal corresponding to the second monochrome screen according to the initial display signal;

wherein the first monochrome screen comprises a plurality of pixels and a driver electrically connected to the pixels;

wherein the driver is configured to obtain a plurality of first sub-display messages of the pixels corresponding to the first sub-light from the first sub-display signal, and to obtain a plurality of second sub-display messages of the pixels corresponding to the second sub-light from the second sub-display signal.

4. A display device, comprising:

a display carrier;

a first monochrome screen configured to receive a first display signal;

a second monochrome screen configured to receive a second display signal;

a first light source configured to project a first light extending through the first monochrome screen and cooperate with the first display signal to display a first image on the display carrier; and a second light source configured to project a second light extending through the second monochrome screen and cooperate with the second display signal to display a second image on the display carrier, wherein the first image and the second image are combined to present a target image on the display carrier;

wherein the first display signal comprises a first sub-display signal and a second sub-display signal, and the first sub-light and second sub-light comprise different colors;

wherein the second light comprises a third sub-light, a color of the third sub-light is different from any one of a color of the first sub-light and the color of the second sub-light;

wherein a frame comprises a first subframe and a second subframe, the first monochrome screen is configured to receive the first sub-display signal in the first subframe and receive the second sub-display signal in the second subframe;

wherein the first light source is configured to project the first sub-light extending through the first monochrome screen in the first subframe and cooperate with the first sub-display signal to display a first sub-image on the display carrier, and is configured to project the second sub-light extending through the first monochrome screen in the second subframe and cooperate with the second sub-display signal to display a second sub-image on the display carrier, and the first image comprises the first sub-image and the second sub-image.

5. The display device according to claim 4, wherein the second monochrome screen is configured to receive the second display signal in the frame, and the frame of the first monochrome screen and the frame of the second monochrome screen are synchronous;

the second light source is configured to project the third sub-light extending through the second monochrome screen in the frame and cooperate with the second display signal to display the second image on the display carrier.

6. The display device according to claim 5, wherein the first monochrome screen is affected by the first sub-display signal to be configured to display a quantity of pixels of the first sub-image and is affected by the second sub-display signal to be configured to display a quantity of pixels of the second sub-image, the second monochrome screen is affected by the second display signal to be configured to display a quantity of pixels of the second image, and the three quantities are equal.

7. The display device according to claim 5, wherein the first subframe comprises a first sub-scan time period and a first sub-light emitting time period after the first sub-scan time period, and the second subframe comprises a second sub-scan time period and a second sub-light emitting time period after the second sub-scan time period;

the first monochrome screen is configured to receive the first sub-display signal in the first sub-scan time period and receive the second sub-display signal in the second sub-scan time period; and the first light source is configured to project the first sub-light extending through the first monochrome screen in the first sub-light emitting time period to display the first sub-image on the display carrier, and is configured to project the second sub-light extending through the first monochrome screen in the second sub-light emitting time period to display the second sub-image on the display carrier.

8. The display device according to claim 5, further comprising:

an image process unit configured to obtain an initial display signal and generate the first display signal corresponding to the first monochrome screen and the second display signal corresponding to the second monochrome screen according to the initial display signal;

wherein the first monochrome screen comprises a plurality of pixels and a driver electrically connected to the pixels;

wherein the driver is configured to obtain a plurality of first sub-display messages of the pixels corresponding to the first sub-light from the first sub-display signal, and to obtain a plurality of second sub-display messages of the pixels corresponding to the second sub-light from the second sub-display signal.

9. The display device according to claim 8, wherein the image process unit is configured to parse the initial display signal to form the first sub-display messages and the second sub-display messages;

the image process unit is further configured to correspondingly fill a first subfill message and a second subfill message after each of the first sub-display messages to correspondingly form a first sub-display message set, and is configured to correspondingly fill a third subfill message and a fourth subfill message after each of the second sub-display messages to correspondingly form a second sub-display message set; and the image process unit is further configured to correspondingly generate the first sub-display signal according to the first sub-display message sets, and is configured to correspondingly generate the second sub-display signal according to the second sub-display message sets.

10. The display device according to claim 9, wherein the first monochrome screen further comprises a plurality of source electrode lines and a switch element, the driver is electrically connected to the source electrode lines, and each of the source electrode lines is connected to a corresponding one of the pixels by the switch element;

the pixels are divided into a plurality of pixel sets, each of the pixel sets comprises corresponding ones of the pixels, a switch-on time period of each of the pixel sets comprises a first time period, a second time period, and a third time period;

in each of the first time periods, the switch element is closed, the source electrode lines are configured to output the first sub-display messages in the first sub-display message sets corresponding to a corresponding one of the pixel sets or the second sub-display messages in the second sub-display message sets corresponding to a corresponding one of the pixel sets;

in each of the second time periods, the switch element is disconnected, the source electrode lines are configured to output the first subfill messages in the first sub-display message sets corresponding to a corresponding one of the pixel sets or the third subfill messages of the second sub-display message sets corresponding to a corresponding one of the pixel sets; and in each of the third time periods, the switch element is disconnected, the source electrode lines are configured to output the second subfill messages in the first sub-display message sets corresponding to a corresponding one of the pixel sets or the fourth subfill messages in the second sub-display message set corresponding to a corresponding one of the pixel sets.

11. The display device according to claim 10, wherein a time length of the first time period is greater than any one of a time length of the second time period and a time length of the third time period.

12. The display device according to claim 9, wherein the first monochrome screen further comprises a plurality of source electrode lines, and the driver is constantly connected electrically to corresponding ones of the pixels by corresponding ones of the source electrode lines;

the pixels are divided into a plurality of pixel sets, each of the pixel sets comprises corresponding ones of the pixels, a switch-off time period is correspondingly disposed after a switch-on time period of each of the pixel sets, and each of the switch-off time periods comprises a fourth time period and a fifth time period;

in the switch-on time period of each of the pixel sets, the source electrode lines are configured to output the first sub-display messages in the first sub-display message sets corresponding to a corresponding one of the pixel sets or the second sub-display messages in the second sub-display message sets;

in each of the fourth time period, the source electrode lines are configured to output the first subfill messages in the first sub-display message sets corresponding to a corresponding one of the pixel sets or the third subfill messages in the second sub-display message sets corresponding to a corresponding one of the pixel sets; and in each of the fifth time period, the source electrode lines are configured to output the second subfill messages in the first sub-display message sets corresponding to a corresponding one of the pixel sets or the fourth subfill messages in the second sub-display message sets corresponding to a corresponding one of the pixel sets.

13. The display device according to claim 8, wherein the image process unit is configured to parse the initial display signal to form a plurality of first sub-display messages, a plurality of second sub-display messages;

the image process unit is further configured to arrange the first sub-display messages to form corresponding ones of first sub-display message sets, and is configured to arrange the second sub-display messages to form corresponding ones of second sub-display message sets;

the image process unit is further configured to correspondingly generate the first sub-display signal according to the first sub-display message sets, and is configured to correspondingly generate the second sub-display signal according to the second sub-display message sets.

14. The display device according to claim 13, wherein the pixels are divided into a plurality of pixel sets, and each of the pixel sets comprises corresponding ones of the pixels;

the image process unit is further configured to divide the first sub-display message sets into a plurality of first message sets corresponding to a plurality of pixel sets, and divide the second sub-display message sets into a plurality of second message sets corresponding to a plurality of pixel sets;

the image process unit is further configured to correspondingly fill a first fill message set after each of the first message sets to correspondingly form a third message set, and correspondingly fill a second fill message set after each of the second message sets to correspondingly form a fourth message set;

the image process unit is further configured to correspondingly generate the first sub-display signal according to the third message sets, and is configured to correspondingly generate the second sub-display signal according to the fourth message sets.

15. The display device according to claim 14, wherein the first monochrome screen further comprises a plurality of source electrode lines, and the driver is constantly connected electrically to corresponding ones of the pixels by corresponding ones of the source electrode lines;

the pixels are divided into a plurality of pixel sets, and each of the pixel sets comprises corresponding ones of the pixels; and in a switch-on time period of each of the pixel sets, the source electrode lines are configured to output the first sub-display message sets or the second sub-display message sets corresponding to a corresponding one of the pixel sets.

16. The display device according to claim 13, wherein the first monochrome screen further comprises a plurality of source electrode lines, and the driver is constantly connected electrically to corresponding ones of the pixels by corresponding ones of the source electrode lines;

the pixels are divided into a plurality of pixel sets, and each of the pixel sets comprises corresponding ones of the pixels; and in a switch-on time period of each of the pixel sets, the source electrode lines are configured to output the first sub-display message sets or the second sub-display message sets corresponding to a corresponding one of the pixel sets.

17. The display device according to claim 5, wherein the second light further comprises a fourth sub-light, a color of the fourth sub-light is the same as the color of the first sub-light or the color of the second sub-light; and the second light source is configured to project the third sub-light extending through the second monochrome screen in the first subframe, and to project the fourth sub-light extending through the second monochrome screen in the corresponding second subframe.

18. The display device according to claim 4, wherein the first subframe comprises a first sub-scan time period and a first sub-light emitting time period after the first sub-scan time period, and the second subframe comprises a second sub-scan time period and a second sub-light emitting time period after the second sub-scan time period;

the first monochrome screen is configured to receive the first sub-display signal in the first sub-scan time period and receive the second sub-display signal in the second sub-scan time period; and the first light source is configured to project the first sub-light extending through the first monochrome screen in the first sub-light emitting time period to display the first sub-image on the display carrier, and is configured to project the second sub-light extending through the first monochrome screen in the second sub-light emitting time period to display the second sub-image on the display carrier.

19. A display device driving method, wherein the display device comprises a display carrier, a first monochrome screen, a second monochrome screen, a first light source, and a second light source, the first light source is configured to project a first light, the first light comprises a first sub-light and a second sub-light comprising different colors, the second light source is configured to project a second light, the second light comprises a third sub-light, a color of the third sub-light is different from any one of the color of the first sub-light and the color of the second sub-light, a frame comprises a first subframe and a second subframe, and the method comprises:

in the first subframe of one frame, controlling the first monochrome screen to receive a first sub-display signal in a first display signal, and controlling the first light source to project the first sub-light extending through the first monochrome screen to display a first sub-image on the display carrier;

in the second subframe of one frame, controlling the first monochrome screen to receive a second sub-display signal in the first display signal, and controlling the first light source to project the second sub-light extending through the first monochrome screen to display a second sub-image on the display carrier, wherein the first sub-image and the second sub-image are combined to present a first image on the display carrier;

in the frame, controlling the second monochrome screen to receive a second display signal, and controlling the second light source to project a third sub-light extending through the second monochrome screen to display a second image on the display carrier, wherein the first image and the second image are combined to present a target image on the display carrier, and the frame of the first monochrome screen and the frame of the second monochrome screen are synchronous.

* * * * *